United States Patent Office 3,128,844
Patented Apr. 14, 1964

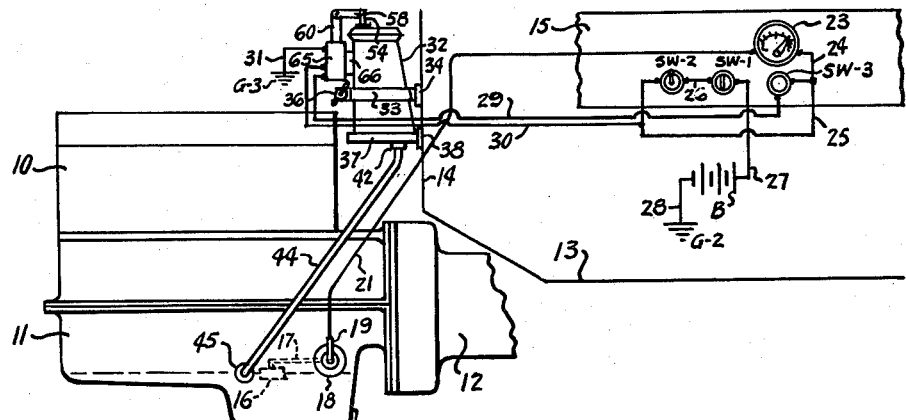
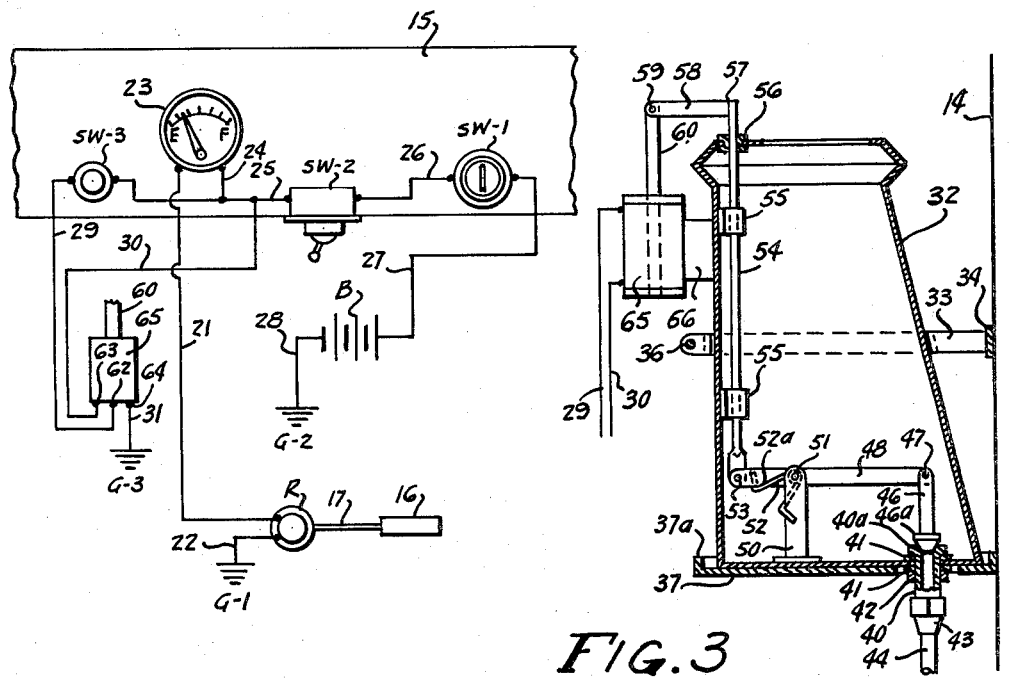
FIG. 1
FIG. 2
FIG. 3
INVENTORS.
JOHN E. BULT
DONALD D. BULT
BY Kimmel & Crowell
ATTORNEYS.

3,128,844
AUXILIARY OIL SUPPLY SYSTEM FOR MOTOR VEHICLE ENGINES
John E. Bult, Wessington Springs, S. Dak., and Donald D. Bult, Kimball, Nebr.
Filed Aug. 27, 1963, Ser. No. 304,887
3 Claims. (Cl. 184—105)

This invention relates to an auxiliary oil supply system for the crankcase of an internal combustion engine of the type that propels a motor vehicle.

It is often the case that the driver of a motor vehicle may allow his oil to run low and find himself far from a filling station with an empty crankcase. This may happen while driving along or while stopped in an isolated location. Also, it is common knowledge that, when a motor vehicle is parked around a motel or tourist camp where the driver is staying for the night, miscreants will sometimes steal the oil, draining it from the crankcase. In these and other cases it is desirable to have an auxiliary oil supply available to at least enable the driver to get to the nearest filling station.

The object of the present invention is to provide an auxiliary oil supply for an internal combustion engine which propels a motor vehicle, which auxiliary oil supply is carried in the engine compartment of the motor vehicle.

Another object of the present invention is to provide an auxiliary oil supply for an internal combustion engine which propels a motor vehicle, which auxiliary oil supply may be released by the driver to flow into the crankcase of the engine without the driver having to leave his seat.

A further object of the present invention is to provide an auxiliary oil supply for an internal combustion engine, which propels a motor vehicle, and means for releasing the auxiliary oil supply to flow into the crankcase of the engine, which means is interconnected with the electrical ignition system of the engine so that the auxiliary oil supply can be released when the engine is not running.

Still other objects, advantages and improvements will become apparent from the following specification, taken in connection with the accompanying drawing, in which:

FIGURE 1 is a combined side elevational view of an internal combustion engine having thereon the auxiliary oil supply according to the present invention, and a schematic view of the dashboard or instrument panel of a motor vehicle propelled by the internal combustion engine;

FIGURE 2 is a layout view of the components and a wiring diagram of the auxiliary oil supply according to the present invention; and FIGURE 3 is a vertical sectional view through the reserve oil can, showing the linkage for operating the outlet valve of the latter.

Referring now to the drawing in detail, and to FIGURE 1 in particular, the reference numeral 10 here designates an internal combustion engine of the type used to propel a motor vehicle, 11 the crankcase, 12 the transmission, 13 the body, 14 the bulkhead, and 15 the dashboard or instrument panel. While the instrument panel 15 is mounted to the rear of the bulkhead 14, it is here shown as turned through 90° for clarity of illustration.

The level of the oil in the crankcase 11 is shown in dotted lines. A float 16 rests on top of the oil and this float is pivotally connected by an arm 17 to a rheostat R, which is mounted within the crankcase 11 by any suitable means (not shown). A flexible conduit 19 is connected through a suitable liquid tight fitting 18 in the side wall of the crankcase 11 and extends to an oil gauge 23 on the instrument panel 15. A conductor 21 is enclosed by the flexible conduit 19 and is connected at one end to the rheostat R and at its other end to the oil gauge 23. The oil gauge is a volume gauge, being calibrated either in quarts or fractions of the crankcase volume, such as "¼ Full", "½ Full" etc.

The electrical circuit for the oil gauge 23 is as follows: The other side of the rheostat R is connected to ground at G–1 over a conductor 22; the other side of the oil gauge 23 is connected by a conductor 24 and a conductor 25 to one side of an oil gauge switch SW–2. The latter is shown as a toggle switch, mounted on the instrument panel 15. The other side of the oil gauge switch SW–2 is connected by a conductor 26 to one side of the key operated ignition switch SW–1, which is mounted on the instrument panel 15 in the usual manner. This switch is connected by a conductor 27 to the negative terminal of the vehicle battery "B", the positive terminal of the battery being connected to ground at G–2 over a conductor 28.

The conductor 25 is also connected to one side of a switch SW–3. This latter switch is preferably a push button switch and is also mounted on the instrument panel 15. It is the control switch for a valve operating electro-magnet 65, to be later described. The other side of this switch SW–3 is connected by a conductor 29 to a terminal 62 for one side of the winding of the electro-magnet 65. The oil gauge switch SW–2 is also connected by a conductor 30 to a terminal 63 for the one side of the electro-magnet 65. The parallel circuits to the electro-magnet 65 are a safety precaution as will be later described. The other side of the winding of the electromagnet 65 is connected from a terminal 64 over a conductor 31 to ground at G–3.

The auxiliary oil supply means according to the present invention is comprised principally by a reserve oil can 32. This can is mounted within the engine compartment of the motor vehicle and on the bulkhead 14 by an upper bracket 33 and a lower bracket 37. The upper bracket 33 is comprised by two complementary semi-circular halves, which at the rear are pivotally mounted on a bar 34. The latter is secured to the bulkhead 14 by suitable machine screws (not shown). At the front, the two halves of the bracket, are secured together by a bolt and wing nut 36. The lower bracket 37 is comprised by a circular plate having a circumferential rim 37a around same, and a supporting flange 38 on the rim. The latter is also secured to the bulkhead 14 by suitable machine screws (not shown).

Referring now to FIGURE 3, the reserve oil can 32 is here shown seated on the lower bracket 37, the upper bracket not being shown. A suitable fitting 40 is threaded throughout most of its length (the threads not being shown) and has an upper flange 40a. This fitting is secured in a hole in the bottom of the oil can 32. A sealing washer 41 is positioned between the flange 40a of the fitting and the inner face of the bottom of the oil can, and a similar sealing washer 41 against the outer face of the bottom of the oil can, the latter being held in place by a nut 42. The oil can is connected to the crankcase 11 by a conduit 44, which is secured at its upper end by a coupling 43 to the fitting 40, and at its bottom end enters the crankcase through a fluid tight fitting 45.

A valve member has a stem 46 and a head 46a. The head 46a normally seats on the upper flange 40a of the fitting 40. A lever 48 is pivotally connected at one end by a pin 47 to the upper end of the valve stem 46. At its other end this lever is pivotally secured to a rod 54 by a pin 53. A bar 50 is secured to the bottom of the can 32 by soldering or welding or the like. The lever 50 is pivoted intermediate its ends to the bar 50 by pin 51. A spring means 52 has a central section engaging over pin 51, one engaging under lever 48 and a second arm engaging bar 50.

The rod 54 is slidably mounted for vertical movement in aligned loops 55—55, which are secured to the inner wall of the can 32. The rod extends through a grommet 56 in the top of the can and at its upper end carries a horizontally positioned arm 58, which is fixedly secured to same at 57. At its outer end the arm 58 is secured by a pin 59 to the upper end of the armature or plunger 60 of the electro-magnet 65. The electro-magnet is enclosed by a suitable cylindrical casing, which latter is secured to the wall of the can 32 by a bracket 66.

The operating circuit for the electro-magnet 65 is from the negative terminal of the battery "B" over the conductor 27 to the ignition switch SW-1, over the conductor 26 to the oil gauge switch SW-2, over the conductor 25 to the operating switch SW-3 for the electro-magnet, and over the conductor 29 to the terminal 62 of the electro-magnet. The other side of the circuit is from the positive terminal of the battery "B" over the conductor 28 to ground at G-2, and from the terminal 64 of the electro-magnet over the conductor 31 to ground at G-3.

In operation, let it be assumed that the ignition switch SW-1 has been moved to a first position, in which position all electrical equipment of the vehicle is on, including the auxiliary oil supply according to the present invention. The oil gauge circuit is from the negative terminal of the battery "B" over the conductor 27, through the ignition switch SW-1, over the conductor 26 to the oil gauge switch SW-2, over the conductors 25 and 24 to the oil gauge 23 and over the conductor 21 to the float operated rheostat R; the return side of this circuit is from the positive terminal of the battery "B" over the conductor 28 to ground at G-2 and from the other side of the rheostat R over the conductor 22 to ground at G-1.

When the engine 10 is not running, the oil gauge 23 gives an accurate indication of the total volume of oil in the crankcase 11; when the engine is running however, at least a quart of oil is being circulated through the engine lubricating system and the indication on the oil gauge 23 does not show the total volume of oil in the engine lubricating system. The electro-magnet 65 will, therefore, be energized to open the valve 46 and release the oil from the auxiliary reservoir 32 into the crankcase 11 after the ignition switch SW-1 is closed, but before the motor is started. The circuitry is so designed that the electro-magnet 65 cannot be energized unless the oil gauge switch SW-2 is closed and the oil gauge 23 is on. The operator of the vehicle therefore cannot release the contents of the auxiliary reservoir 32 into the crankcase 11 without at least being apprised of the level of the oil in the crankcase. When the oil gauge switch SW-2 is closed, the circuit to the electro-magnet 65 is complete over the conductor 30. However the electro-magnet will not be energized, as this parallel circuit is designed to not pass enough current. The operating switch SW-3 must be closed to energize the electro-magnet 65. The circuit over the conductor 25, through the operating switch SW-3, and over the conductor 29 is also designed to not pass sufficient current to energize the electro-magnet 65 by itself. This is a safety feature so that a child playing on the front seat of the motor vehicle cannot close the switch SW-2, energize the electro-magnet 65 and flood the crankcase. The total current flowing over the first branch circuit, comprised by the conductor 25, the operating switch SW-3, and the conductor 29, and the second branch circuit, comprised by the conductor 30, is however sufficient to energize the electro-magnet 65; operate the valve 46 and release the contents of the auxiliary oil reservoir 32 into the crankcase 11. It will thus be seen that all three (3) of the switches SW-1, SW-2, and SW-3, must be closed in order for the electro-magnet 65 to be energized and the valve 46 operated.

Having now fully described our invention, what we claim as new and useful and desire to secure by Letters Patent of the United States is:

1. In an auxiliary supply system for an internal combustion engine propelling a motor vehicle and having a battery and a crankcase forming an oil reservoir with a supply of oil therein, the improvement which comprises an auxiliary oil container having an auxiliary oil supply therein, conduit means communicating between said auxiliary oil container and the oil reservoir in the crankcase, valve means operatively interposed in said conduit means, and actuating means for opening said valve means, said actuating means including electrical means for lifting said valve means, a first parallel circuit from the battery to said electrical means, a first switch interposed in said first parallel circuit, and a second parallel circuit from the battery to said electrical means, a second switch interposed in said second parallel circuit, the current supplied by each of said first and second parallel circuits separately being insufficient to energize said electrical means, and the combined current supplied by both said first and second parallel circuits together being sufficient to energize said electrical means.

2. In an auxiliary supply system for an internal combustion engine propelling a motor vehicle and having a battery, an ignition switch, an oil gauge and a crankcase forming an oil reservoir with a supply of oil having a top surface therein, the improvement which comprises, in combination, an auxiliary oil container having an auxiliary oil supply therein, a conduit from said auxiliary oil container to the oil reservoir in the crankcase, a valve controlling the flow of said auxiliary oil supply from said auxiliary oil container through said conduit, an electro-magnet operatively connected to said valve for operating said valve, a first switch for controlling said electro-magnet, a second switch operatively connected to the oil gauge, and means including said second switch responsive to the level of the top surface of the oil supply in the crankcase for indicating the same on the oil gauge, a first parallel circuit from the battery, through the ignition switch, said first switch and said second switch to said electro-magnet, and a second parallel circuit from the battery, through the ignition switch and said second switch and to the electromagnet, the current supplied by each of said first and second parallel circuits separately being insufficient to energize said electromagnet and thereby operate said valve, and the combined current supplied by both said first and second parallel circuits together being sufficient to energize said electromagnet and to thereby operate said valve.

3. The structure of claim 2 wherein said means for indicating the level of the top surface of the oil supply in the crankcase on the oil gauge includes a float means carried on the said top surface, a rheostat operatively connected to said float means to vary the current through said rheostat in response to a change in the level of the top surface, and an additional circuit from the battery, through the ignition switch and said second switch to said rheostat.

References Cited in the file of this patent
UNITED STATES PATENTS

| | | |
|---|---|---|
| 1,537,131 | Oestreicher | May 12, 1925 |
| 1,583,696 | Lane | May 4, 1926 |
| 2,792,912 | Kangas | May 21, 1957 |